United States Patent [19]
Siarto

[11] 4,130,920
[45] Dec. 26, 1978

[54] MACHINE TOOL
[75] Inventor: Andrew V. Siarto, West Bloomfield, Mich.
[73] Assignee: Siorto Machine & Tool Co., Inc., West Bloomfield, Mich.
[21] Appl. No.: 843,769
[22] Filed: Oct. 20, 1977

Related U.S. Application Data

[63] Continuation-in-part of Ser. No. 801,181, May 27, 1977.

[51] Int. Cl.² .............................................. B23P 23/00
[52] U.S. Cl. .................................................... 29/38 R
[58] Field of Search .................... 29/38 R, 38 A, 38 B, 29/38 C

[56] References Cited
U.S. PATENT DOCUMENTS

| | | | |
|---|---|---|---|
| 3,336,823 | 8/1967 | Bonzi | 29/38 C |
| 3,609,838 | 10/1971 | Wiest | 29/38 C |
| 3,742,791 | 7/1973 | Sato | 29/38 A |

Primary Examiner—Harrison L. Hinson
Attorney, Agent, or Firm—Cullen, Sloman, Cantor et al.

[57] ABSTRACT

A machine tool wherein an angular gear is rotatable in a horizontal plane to carry a plurality of pallets between adjacent peripherally arranged machine stations. Hydraulic power means are provided to raise the gear for transport between adjacent stations and to lower the gear for location at each station in turn. The pallets are each carried by the gear and are hydraulically locked, preferably by the same hydraulic raising and lowering mechanism into finely adjusted position at each machine station by precisely located, telescopically interfitting elements on the gear support table and on the pallets, respectively. Means are provided for accommodating final adjusting movement of the pallets relative to the gear at each machine station, yet fixing the pallet relative to the gear during transport.

8 Claims, 9 Drawing Figures

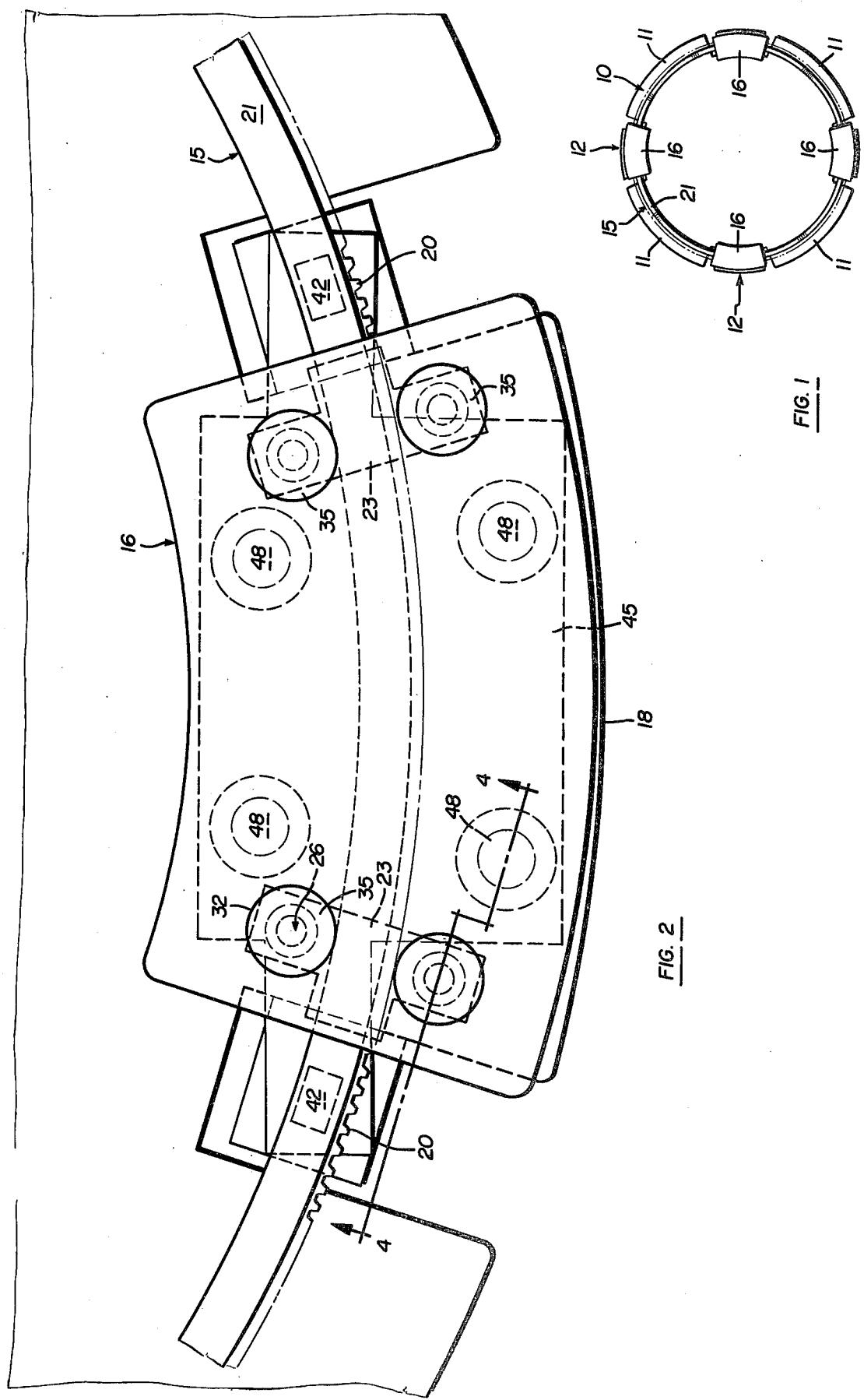

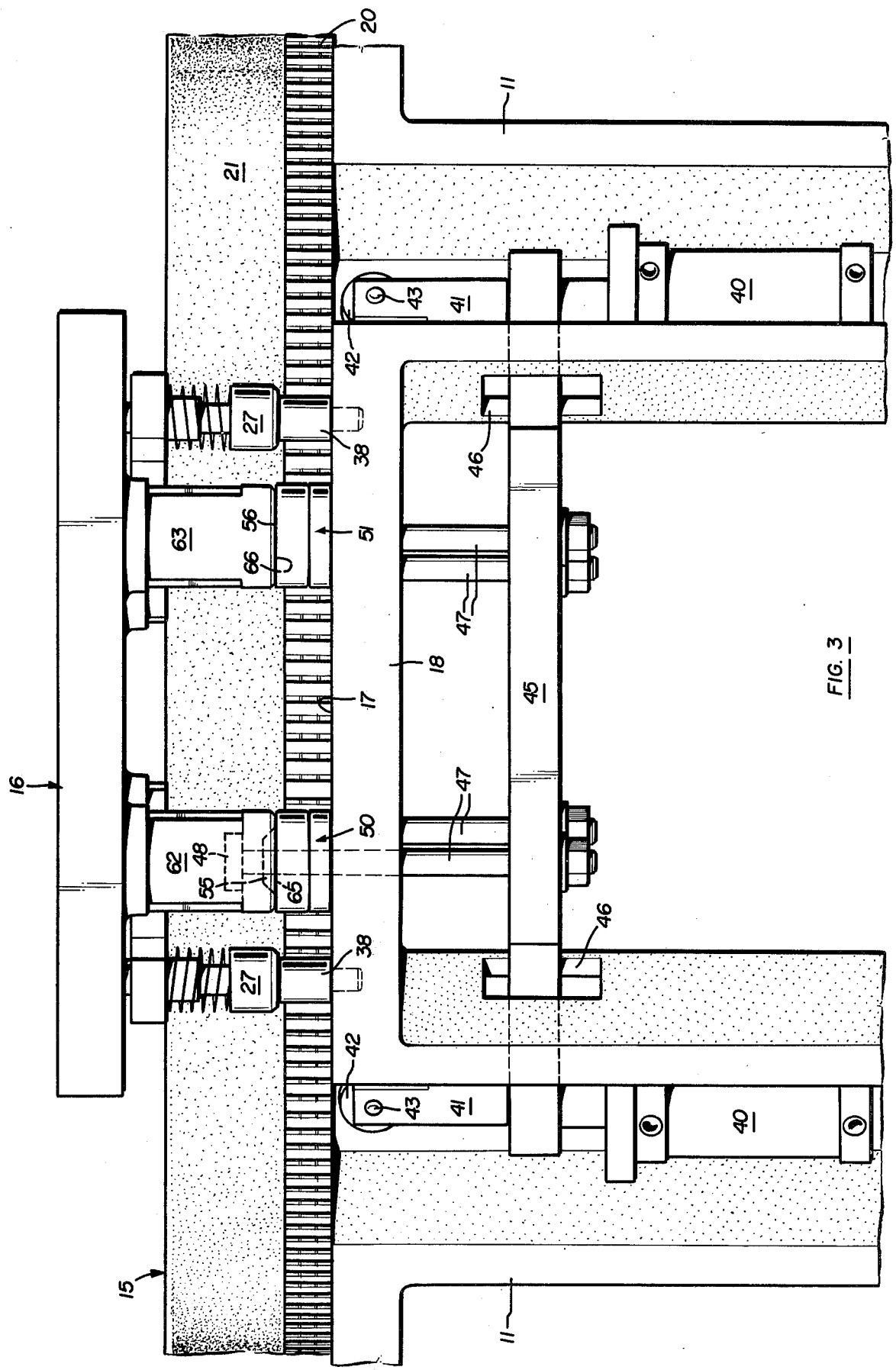

MACHINE TOOL

RELATED APPLICATIONS

The instant application is a continuation-in-part of my earlier filed application Ser. No. 801,181, filed May 27, 1977.

BACKGROUND OF THE INVENTION

The present invention constitutes a specific, needed improvement over the machine tool disclosed in U.S. Pat. No. 3,609,838, also constitutes a specific variant upon the machine tool design of my earlier application Ser. No. 801,181.

As explained in my earlier application, it is quite desirable, in a machine tool of the type wherein a plurality of peripherally spaced pallets are carried on an angular annular rotatable gear, to have the pallets carried directly by the gear, rather than through a "spring pack" interposed between the pallet and the gear. In my earlier application, the gear was raised and lowered by means of support rollers or the like cooperable with cam recesses formed in the under surface of the gear itself. While this type of machine tool is prefectly feasible and has been commercially successful, the present invention provides a further improvement in the gear elevating and lowering mechanism and also in the mechanism for clamping each pallet at a machining location.

In both the prior art Wiest U.S. Pat. No. 3,609,838 an my earlier application, the same clamping structure was utilized, i.e. clamping was effected between a conical recess on the pallet itself and a conical head carried by clamping cylinders located at each machining station. The final location at the machining location is attained by interfitting engagement of these two conical surfaces.

Further, in my earlier invention, the pallet was connected to the gear through a simple "lost motion" connection, and the pallet could move relative to the gear as the pallet was being transported by the gear between machining locations.

An improved locating and clamping mechanism and the elimination of relative pallet-gear movement during transport would be desirable improvements upon my earlier invention.

BRIEF SUMMARY OF THE PRESENT INVENTION

The present invention proposes specific improvements over my earlier invention and also over the Wiest patent. As in my earlier invention, the gear is elevated for transport and is lowered for clamping at the machine location. A plurality of hydraulically actuated rollers contact the undersurface of the gear and support the gear for rotation when the rollers are elevated. Upon lowering of the rollers, the gear is supported upon the fixed composite support table with each gear-carried pallet in rough alignment with a machining location.

Fixed, upwardly projecting locating surfaces are provided on the support table at each machining location, and the pallet is provided with similarly contoured recesses which interfittingly engage the projecting table surfaces as the gear is lowered. Hydraulic clamping means, preferably commonly actuated with the gear raising and lowering rollers, is provided to firmly clamp the locating surfaces in interfitting engagement.

A spring urged shot pin interconnects the pallet and the gear during transport, thereby fixing the workpieces to the gear during movement. As the gear is lowered at the machining station and prior to final location and clamping of the pallet, the spring force is removed from the locating pin, so that the pallet can be freely adjusted relative to the gear.

OBJECTS

It is an important object of the present invention to provide an improved machine tool of annular configuration and wherein an annular gear is utilized to convey a series of work-carring pallets to a series of work stations with the pallets being fixed in an accurate machining location by fixed abutments located at the stations and nestingly engagable with reference surfaces on the pallets themselves.

It is another important object of the present invention to provide an improved machine tool of annular configuration wherein a series of pallets are carried on an annular gear, the gear being raised to a transport position to convey the pallets to their respective work stations, the pallets being fixed to the gear only during transport and being freely movable relative to the gear for adjustment at each machining location.

Yet another, and no less important, object of the present invention is the provision of a machine tool wherein an annular gear carries a series of pallets between a corresponding series of work stations and a common fluid pressure actuated mechanism is provided for raising and lowering the gear and for accurately locating and clamping each pallet in an accurate machining location.

ON THE DRAWINGS

FIG. 1 is a plan view, on a reduced scale, of a machine tool of the present invention;

FIG. 2 is an enlarged fragmentary plan view;

FIG. 3 is a fragmentary side elevational view of the machine tool of the present invention;

DETAILED DESCRIPTION OF THE PREFERRED EMBODIMENTS

Figure 4:
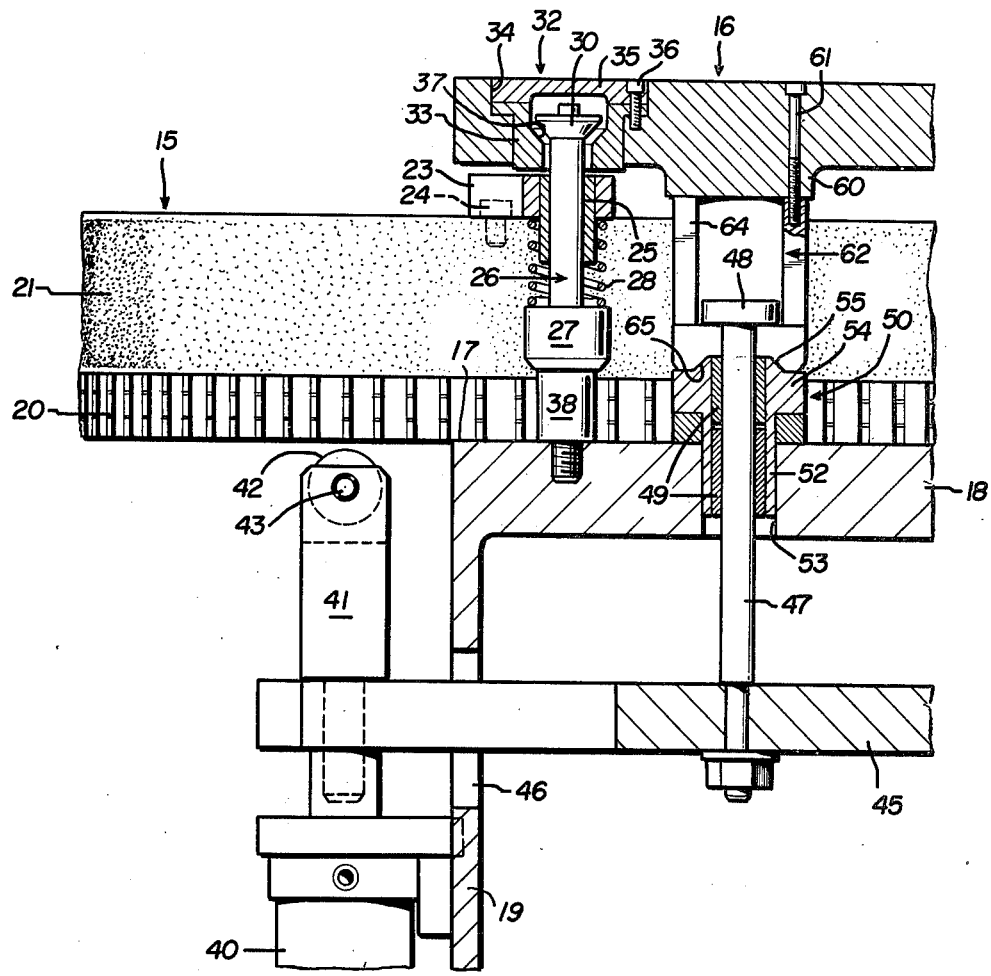
FIG. 4 is a fragmentary sectional view taken along the planes 4—4 of FIG. 2 illustrating the machine tool in its operative machining position.

A first preferred embodiment of the present invention is illustrated in FIGS. 1-5, inclusive and, as best illustrated in FIG. 1, this version of the invention incorporates a composite base or support table 10 comprising segmental base sections 11 positioned between peripherally spaced work stations 12 traversed by an annular gear 15 carrying pallets 16. In that version of the invention shown in FIG. 1, there are four work stations 12, four pallets 16, and four support segments 11 spanning the work stations. It will be appreciated that the number of work stations may vary from 2 to 8 or more, with one or more of these work stations being loading and unloading stations, and that the machine normally incorporates a number of pallets 16 equivalent to the number of work stations 12.

As best shown in FIG. 3, each work station includes an upper planar support or reference surface 17 formed as a part of support 18 mounted on legs 19 and forming a part of the composite work support or work table 10. It will be appreciated that the surfaces 17 form reference surfaces from which are mounted the machine tools which carry out various machine operations on workpieces carried by the pallets 16. For clarity of illustration, neither the machine tools nor the workpieces are shown, since these elements are widely variable and form no portion of the present invention.

The annular gear 15 is provided with outwardly facing, lower peripheral geared teeth 20 and with an upstanding annular support flange 21. The gear is supported for rotation upon internal guide rollers and is driven by a powered pinion gear, all as disclosed in my earlier application Ser. No. 801,181, so that these elements are not herein shown in the drawings.

The gear 15 carries on its upper surface a pair of mounting flanges 23 fixedly secured to the upper edge of the gear flange 21 by suitable means (not shown), these mounting brackets 23 being generally "T"-shaped as shown in elevation in FIG. 2.

These brackets 23 serve to support the pallets 16 for travel with the gear 15, each bracket having a pair of depending tubular bushings 25 through which a support pin 26 projects. Each pin is provided with a lower enlarged end 27, and a compression spring 28 is confined between the bracket 23 and the pin head 27. The upper end of each pin 26 is provided with a conical locating head 30 entrapped within a locating assembly 32 carried by the pallet 16. Each locating assembly 32 includes a lower locating block 33 seated in a recess 34 formed in the upper surface of the pallet, and, each block 33 is confined in the recess 34 by an upper closure plate 35 secured to the pallet by suitable means 36. Each block 33 has an upwardly flaring conical recess 37 mating with the conical head 30 of the pin 26.

Figure 5:
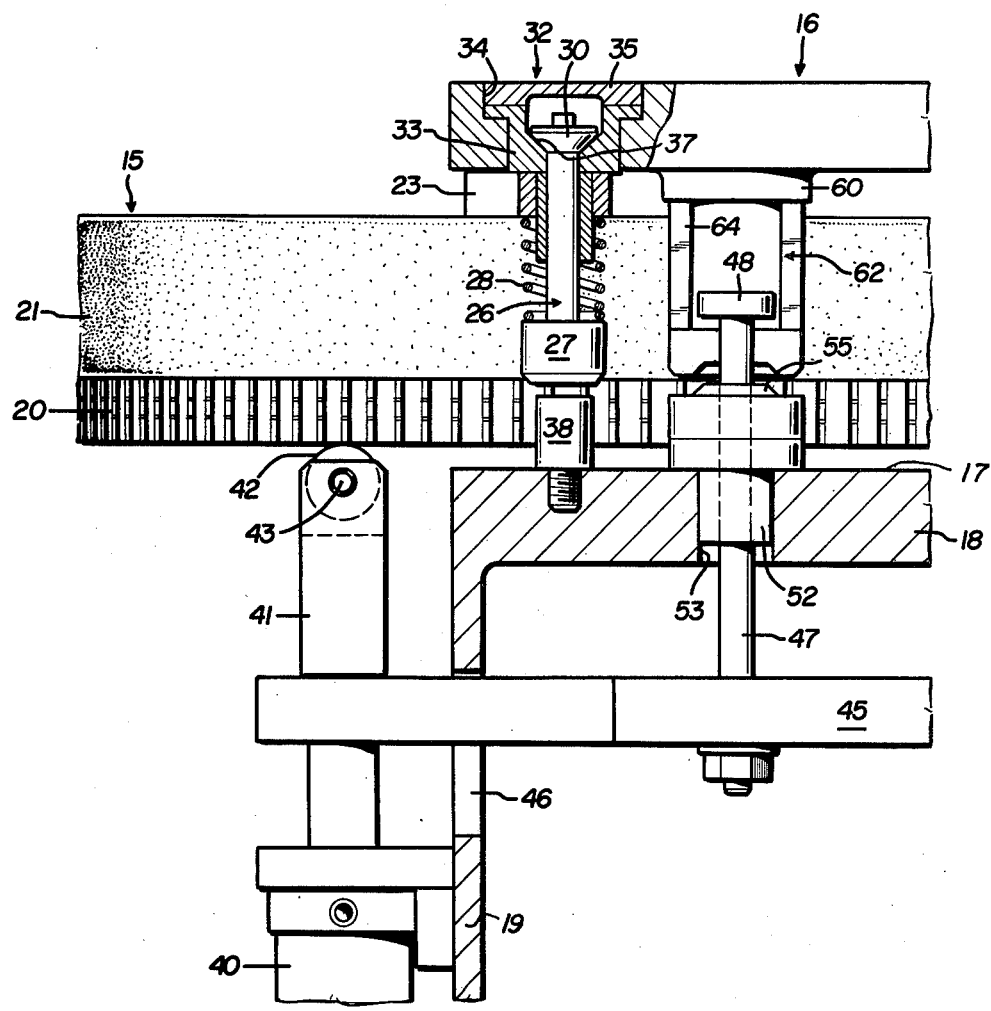
FIG. 5 is a sectional view similar to FIG. 4 showing the machine tool in its elevated, transport position.

When the machine tool is in its position of FIG. 4, i.e. with the gear 15 in its lowered position, the pin head 27 of the pin 26 contacts the upper surface of a fixed abutment block 38 which is secured to the table reference surface 17. The head of the block 38 is located so that lowering of the gear 15 abuts the head 27 with the block 38 to compress the spring 28, thereby spacing the conical head 30 of the pin 26 from the conical locating seat 37 and freeing the pallet 16 for movement relative to the gear 15. When the gear 15 is in its elevated transport position, as illustrated in FIG. 5, the head 27 is elevated from contact with the block 38, the spring 28 lowers the pin 26 and the surfaces 30, 37 are urged into contact under the force of the spring 28, thereby fixing the pallet 16 to the gear 15 for comovement.

The mechanism for raising and lowering the gear 15 is best illustrated in FIG. 3 of the drawings. It will be seen, from FIG. 3, that each work station includes a pair of power actuators or means 40. As illustrated, the power actuators 40 are hydraulic cylinders, although pneumatic cylinders or electrical actuators, such as recirculating ball screws can be utilized. A piston rod 41 of each of the cylinders 40 projects upwardly and carries at its upper end a support roller or element 42 mounted on a horizontal axle 43. The rollers or support elements or rotatable means 42 are vertically aligned with the undersurface of the gear 15 for contact with the gear upon vertical upward actuation of the actuators 40. The two cylinders for each work station are simultaneously actuated and are interconnected by a cross bar 45 which project through vertically elongated apertures 46 in the support table legs 19. Secured to the bar 45 and projecting upwardly therefrom are vertical actuating rods 47 bearing at their upper ends enlarged clamping heads 48. The rods 47 are guided by annular sleeves 49 carried by locating embossments indicated generally at 50, 51. These locating embossments 50, 51 have lower cylindrical extensions 52 located in apertures 53 in the table plate 18 and have upper enlarged ends 54. Embossments 50 are provided at their upper extremities with conical locating surfaces 55, while the embossments 51 are provided at their upper extremities with planar surfaces 56 for a purpose to be hereafter more fully described. Each machining location is provided with a pair of locating embossments 50 and a pair of locating embossments 51, the embossments 50 being located diagonally with respect to one another, and the embossments 51 occupying the other diagonal.

Formed on the undersurface of each of the pallets 16 are a plurality of depending bosses 60 to which are secured, as by cap screws 61, a generally cylindrical depending locating element 62, 63. Four of these depending elements 62, 63 are provided for vertical alignment with the four locating embossments 50, 51.

The locating elements 62, 63 are each provided with intermediate slots 64 accommodating the entry of the enlarged clamping head 48 as the gear and the pallet are rotated with respect to the support 18 and the heads 48. The locating elements 62, 63 are provided with lower abutting faces 65, 66 for contacting the upper extremities 55, 56 of the locating embossments 50, 51. As shown in FIG. 4, the lower surface 65 of the locating element 62 is contoured to match the conical surface 55, i.e. the surface 65 is in the form of a concave conical surface matingly receiving the convex conical surface 55. The lower extreme surface 66 of the locating element 63 is planar to matchingly engage the planar surface 56 of the locating embossment 51.

In operation, assuming the machine tool to be in its seated position of FIGS. 3 and 4, the first step in indexing the table is to actuate the power actuators 40 to raise the rollers 42 into contact with the undersurface of the gear 15, and then to further actuate the actuators 40 to elevate the gear 15 from contact with the surface 17 of the support table 18. It will be seen that this elevation of the gear 15 will simultaneously elevate the cross member 45 and raise the clamping heads 48 to their positions illustrated in FIG. 5, so that the pallet 16 is no longer clamped to the support 18. This same movement raises each of the spring pressed pins 26 from contact with its abutment 38, allowing the spring 28 to pull the conical pinhead 30 downwardly and into engagement with the conical seat 37, so that the pin 26 interconects the pallet 16 and the gear 15 for comovement under the pressure of the spring 28. Since four such pin and spring connections are used, a firm interconnection is provided.

Next, the gear 15 is indexed to the next machining station (by means shown and described in my earlier application). This movement is accommodated by the slots 64 in the depending clamping bosses 62,63 of the pallets 16, which slots allow relative movement between the elevated clamping heads 48 and the embossments 50, 51.

When the gear 15 has been indexed to the next machining station, the actuators 40 are actuated to lower the gear 15 and the pallets 16 carried thereby. Lowering of the pallets 16 brings the enlarged pin heads 27 into contact with the underlying abutments 38, separating the conical pinhead 30 from its seating surface 37 and freeing the pallet 16 for adjustment relative to the gear 15. Next, the bottom surfaces 65, 66 contact their corresponding surfaces 55, 56 with the mating conical surfaces 55, 65 accurately locating the pallet 16 relative to the table reference surface 17 and the machining elements carried thereby. Finally, continued downward actuation of the actuators 40 bring the enlarged heads 48 (which were positioned in the slots 64 during gear rotation to the next machining operation) downwardly into clamping engagement when the locating elements 62,63 to finally clamp the pallet 16 in position.

Figure 6:
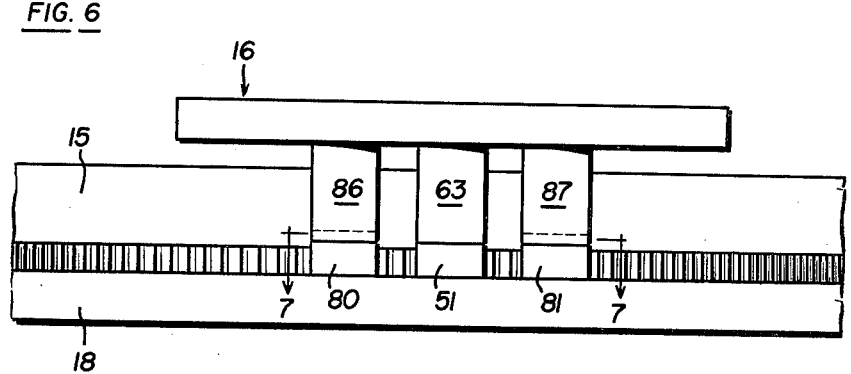
FIG. 6 is a view similar to FIG. 3, but on a reduced scale of a modified version of the machine tool of the present invention.
Figure 7:
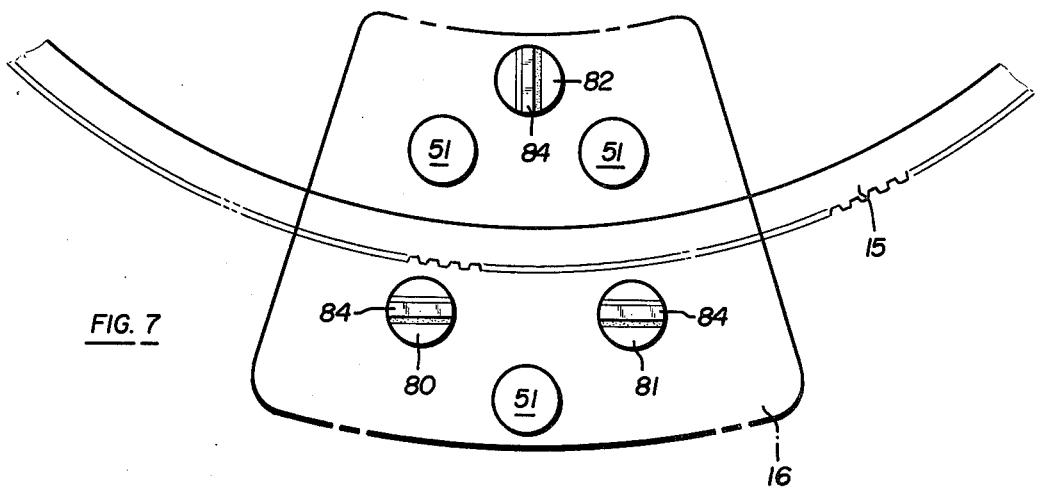
FIG. 7 is a sectional view taken along the plan 7—7 of FIG. 6.
Figure 8:
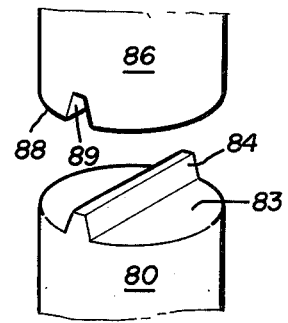
FIGS. 8 and 9 are enlarged fragmentary elevational views of the locating and clamping mechanism of that embodiment of the machine shown in FIGS. 6 and 7.
Figure 9:
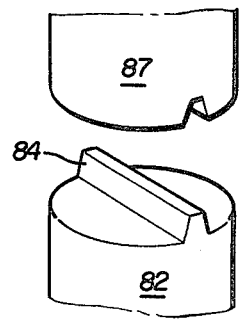

A different embodiment of the present invention is illustrated in FIGS. 6 through 9. As best illustrated in FIGS. 6 and 7, the pallet 16 and the support 18 engage one another through plane abutment surfaces 51, 63, provided with the same elevating and lowering mechanism as earlier described in connection with FIGS. 1 through 5. It will be noted that three such abutment surfaces 51, 63 are provided. Located at the machining station are a plurality of upstanding abutments 80, 81 and 82. Each of these abutments is provided with a planar upper surface 83 and an upwardly projecting tapered key 84. It will be noted that the keys 84 for the abutments 80 and 81 are oriented to lie tangentially to the periphery of the gear 15, while the key 84 of the element 82 is located to lie radially of the periphery of the gear 15.

Carried by the pallet 16 is a plurality of depending generally cylindrical pallet abutments 86, 87 having planar lower surfaces 88 provided with a tapered radial slot 89 of a contoured to snugly receive the key 84 on that abutment 80, 81, 82 which is vertically aligned with the pallet abutment 86, 87.

In operation, the gear and pallets are raised as earlier described and are indexed into rough alignment with the machining station. The gear and pallets are then lowered as above described. As the pallet 16 is lowered, the keys 84 of the abutments 80, 81, 82 enter the tapered corresponding recesses 89 of the pallet abutments 86, 87 to locate the pallet with extreme accuracy relative to the reference surface of the table 18 and with respect to the machine station.

The orientation of the keys 84 of the various abutments is relatively unimportant, so long as two of the keys are located at the right angles to the third key, thereby giving 360° orientation in the reference plane. Of course, the recesses 89 oriented similarly to that key which is aligned therewith. Further, the separation of the clamping mechanisms from the indexing and locating mechanisms may well be desirable for certain pallet configurations.

I claim:

1. In a rotary transfer machine tool having a gear supported for rotation over a fixed, angular, composite support table, a plurality of peripherally spaced pallets superimposed on said gear for rotation therewith, a plurality of work stations spaced at the pallet intervals, and drive means for rotatably driving the gear in step-wise fashion to roughly align each pallet with one of said work stations, the improvements of a plurality of peripherally spaced rotatable support elements underlying said gear, power means for raising and lowering said support elements to correspondingly raise and lower said gear relative to said table, and mating locating elements on said table and said pallets for interfitting snug engagement when said gear is lowered to accurately position each pallet.

2. In a rotary transfer machine tool having a gear supported for rotation over a fixed, annular support table, a plurality of peripherally spaced pallets superimposed on said gear for rotation therewith, a plurality of work stations spaced at the pallet intervals, and drive means for rotationally driving the gear in step-wise fashion to roughly align each pallet with one of said work stations, the improvements of power means for raising and lowering said gear relative to said table, rotatable means interposed between said power means and said gear and supporting said gear for rotation relative to the power means when the gear is raised, means clamping said pallet to said gear when the gear is elevated for rotation, and means at each machine station for unclamping said clamping means to accommodate relative minute adjustment of said pallet relative to said gear.

3. In a rotary transfer machine tool having a gear supported for rotation over a fixed annular composite support table, a plurality of peripherally spaced pallets superimposed on said gear for rotation therewith, a plurality of work stations spaced at said pallet intervals and drive means for rotatably driving said gear in step-wise fashion to roughly align each pallet with one of said work stations, the improvements of means for elevating and lowering said gear and pallets carried thereby, fixed contoured locating surfaces located at each machining station, mating contoured locating surfaces on said pallets for contacting said fixed surfaces when the pallet is lowered at the work station, and clamping means located at each work station and engageable with the pallet to urge the locating surfaces into snug mating engagement.

4. In a rotary transfer machine tool having a gear supported for rotation over a fixed, angular, composite support table, a plurality of peripherally spaced pallets superimposed on said gear for rotation therewith, a plurality of work stations spaced at the pallet intervals, and drive means for rotatably driving the gear in step-wise fashion to roughly align each pallet with one of said work stations, the improvements of power means for raising and lowering said gear relative to said table, mating, essentially conical locating elements on said table and said pallets for interfitting snug engagement when said gear is lowered to accurately position each pallet and clamping means urging said locating elements into engagement to secure each pallet in its accurate position.

5. In a rotary transfer machine tool having a gear supported for rotation over a fixed, annular support table, a plurality of peripherally spaced pallets superimposed on said gear for rotation therewith, a plurality of work stations spaced at the pallet intervals, and drive means for rotationally driving the gear in step-wise fashion to roughly align each pallet with one of said work stations, the improvements of power means for raising and lowering said gear relative to said table, rotatable means interposed between said power means and said gear and supporting said gear for rotation relative to the power means when the gear is raised, means securing said pallet to said gear when the gear is elevated for rotation, and means at each machine station for unclamping said securing means when the gear is lowered to accommodate adjustment of said pallet relative to said gear.

6. A rotary transfer machine tool comprising a gear supported for rotation over a fixed annular composite support table, a plurality of peripherally spaced pallets superimposed on said gear for rotation therewith, a plurality of work stations spaced at said pallet intervals and drive means for rotatably driving said gear in stepwise fashion to roughly align each pallet with one of said work stations, means for elevating and lowering said gear and pallets carried thereby, means securing the pallets to the gear when the gear is elevated, means releasing the securing means when the gear is lowered, fixed contoured locating surfaces located at each work station, mating contoured locating surfaces on said pallets for contacting said fixed surfaces when the pallet is lowered at the work station, and clamping means located at each work station and engageable with the pallet to urge the locating surfaces into snug mating engagement.

7. A machine tool as defined in claim 6, wherein the fixed locating surfaces are conical and the mating locating surfaces are also conical.

8. A machine tool as defined in claim 6, wherein the fixed locating surfaces are linear convex surfaces and the mating locating surfaces are linear concave surfaces, and a plurality of such surfaces are provided which are angularly related to one another.

* * * * *